(12) United States Patent
Osman et al.

(10) Patent No.: US 7,977,910 B2
(45) Date of Patent: Jul. 12, 2011

(54) METHOD OF STARTING A SYNCHRONOUS MOTOR WITH A BRUSHLESS DC EXCITER

(75) Inventors: Richard H. Osman, Pittsburgh, PA (US); Kinjal Patel, Monroeville, PA (US); Mukul Rastogi, Murrysville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 608 days.

(21) Appl. No.: 12/105,766

(22) Filed: Apr. 18, 2008

(65) Prior Publication Data

US 2008/0258672 A1 Oct. 23, 2008

Related U.S. Application Data

(60) Provisional application No. 60/913,128, filed on Apr. 20, 2007.

(51) Int. Cl.
*H02P 23/00* (2006.01)
*H02P 25/00* (2006.01)
*H02P 1/50* (2006.01)

(52) U.S. Cl. ........ 318/716; 318/712; 318/718; 318/721; 318/268; 318/270; 322/10; 322/29; 322/89

(58) Field of Classification Search .................. 318/716, 318/718, 721, 268, 270; 322/10, 29, 89
See application file for complete search history.

(56) References Cited

U.S. PATENT DOCUMENTS

| 3,582,735 A | 6/1971 | Maruschak |
| 5,594,322 A * | 1/1997 | Rozman et al. ................. 322/10 |
| 2002/0074803 A1 | 6/2002 | Kajiura |
| 2003/0209910 A1 | 11/2003 | Nelson |

FOREIGN PATENT DOCUMENTS

| EP | 1717944 A1 | 11/2006 |
| JP | 2007037274 A | 2/2007 |

* cited by examiner

*Primary Examiner* — Walter Benson
*Assistant Examiner* — Erick Glass
(74) *Attorney, Agent, or Firm* — Filip A. Kowalewski

(57) ABSTRACT

A starting method and system for a motor where the motor may be started as an induction motor by applying a magnetizing current to build flux through the stator, with the field current set at the maximum permissible exciter stator current (i.e., the current that will cause rated no-load current in the main field at the transition speed). The motor stator currents will be maintained at a value that allows the motor to generate sufficient breakaway torque to overcome any stiction. At a specific transition speed or after a period of time, the drive will initiate a transition from induction motor control to synchronous motor control by removing the initial magnetizing current, and a field current is then applied to the motor through the DC exciter. Once this transition is completed, the drive may ramp up to the desired speed demand.

13 Claims, 6 Drawing Sheets

METHOD OF STARTING A SYNCHRONOUS MOTOR WITH A BRUSHLESS DC EXCITER

CROSS REFERENCE TO RELATED APPLICATION

This application claims the priority benefit of U.S. Provisional Patent Application No. 60/913,128, filed on Apr. 20, 2007.

BACKGROUND

Many synchronous machines, such as motors designed to be started with a thyristor soft-starter, have or use a brushless direct current (DC) exciter. The exciter is used to help overcome the inertia associated with accelerating the rotor from a resting position to full speed.

In various situations, it is desirable to operate a synchronous motor with a brushless DC exciter with a medium voltage, variable-frequency drive (VFD) motor controller such as those described in U.S. Pat. No. 5,625,545 to Hammond. A medium voltage VFD motor controller provides a required initial current for start up of a synchronous motor with a brushless DC exciter while avoiding a voltage drop in the utility supply voltage. However, for operation without a requirement of a speed sensor, a synchronous motor with a brushless DC exciter should be synchronized before significant load is applied. Otherwise, the machine may slip a pole and cause the flux to decrease rapidly, sometimes causing a loss of speed control. Accordingly, using a VFD without a speed sensor to start a synchronous motor having a brushless DC exciter can be difficult.

One option to overcome this difficulty has been to replace the DC exciter with an alternating current (AC) exciter so that excitation can be applied at standstill. However, in many situations this course of action can be mechanically difficult, as it requires replacement of a part in often hard-to-access locations.

The disclosure contained herein describes attempts to solve one or more of the problems listed above.

SUMMARY

This document describes a starting method without a requirement of a speed sensor in which a synchronous machine having a brushless DC exciter may be started as an induction motor and, at a particular transient speed, may be switched to a synchronous motor operation.

Under operation without the requirement of a speed sensor, unlike synchronous motors with an AC exciter, synchronous motors with a brushless DC exciter require a different starting strategy to pull the motor into synchronization. In the method described in this document, a VFD may begin its operation by spinning the motor's rotor in an asynchronous manner. Once the rotor is spinning, the drive may pull the motor into synchronism and transition to normal synchronous motor control.

In an embodiment, the motor may be started as an induction motor by applying a magnetizing current to build flux through the stator, with the field current set at the maximum permissible exciter stator current (i.e., the current that will cause rated no-load current in the main field at the transition speed). The motor stator currents will be maintained at a value that allows the motor to generate sufficient breakaway torque to overcome any stiction. At a specific transition speed or after a period of time, the drive will initiate a transition from induction motor control to synchronous motor control by removing the initial magnetizing current, and a field current is then applied to the motor through the DC exciter. Once this transition is completed, the drive may ramp up to the desired speed demand.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure.

As used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

Figure 1:
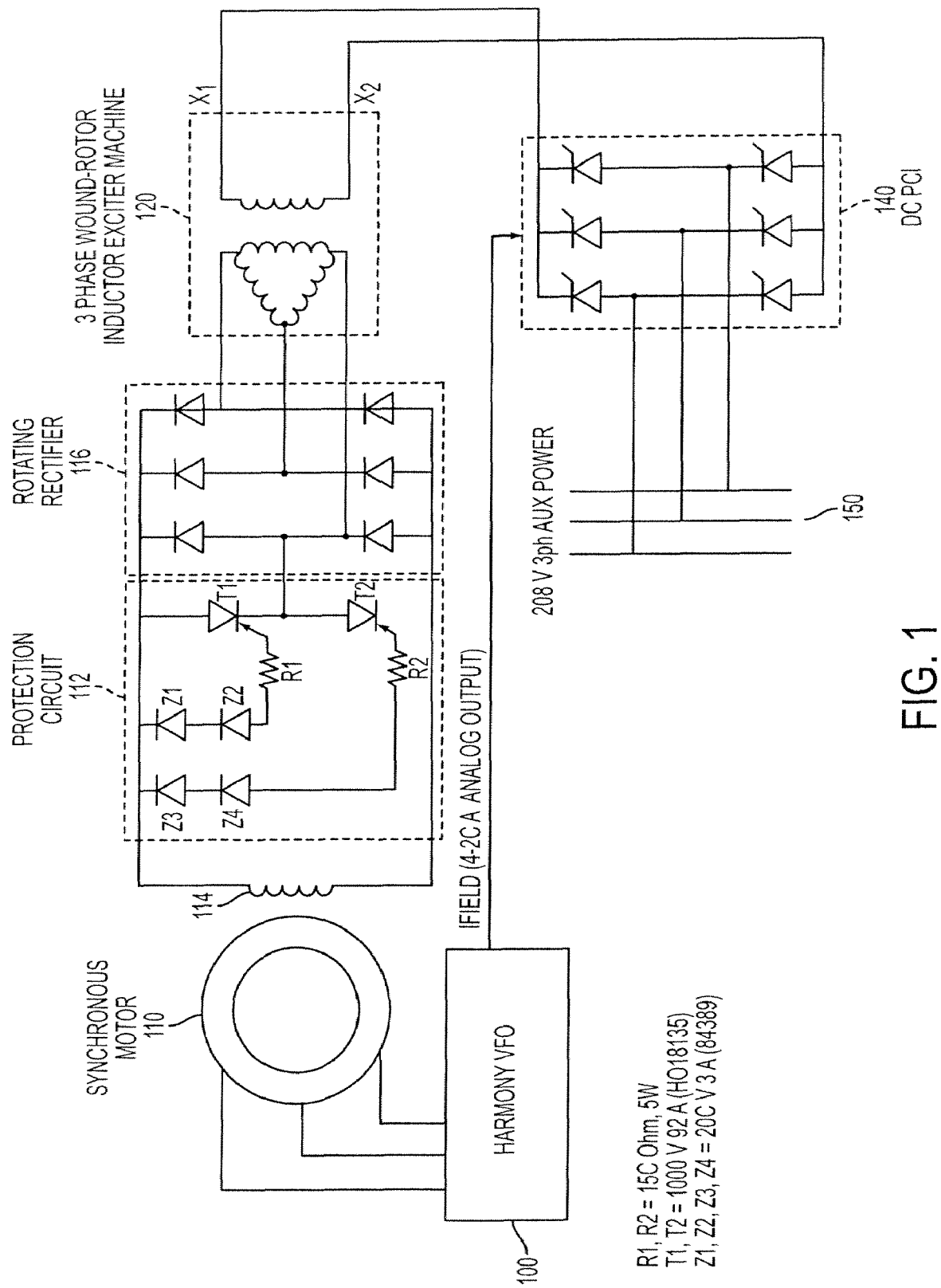
FIG. 1 is a block diagram of a VFD controlling an asynchronous motor.

FIG. 1 illustrates an exemplary configuration for a variable frequency drive (VFD) 100, brushless direct current (DC) exciter 120 and synchronous motor 110. As illustrated in FIG. 1, the VFD 100 may be connected to deliver power to the stator of motor 110. Specifically, VFD 100 provides an initial magnetizing current ($I_{ds}$), an initial field current ($I_{field}$) and an initial torque current ($I_{qs}$) to motor 110. These three currents are discussed in more detail with respect to FIG. 2 and FIG. 3 below. Motor 110 may include a protection circuit 112 that includes thyristors, Zener diodes, resistors and/or other devices to protect the field winding(s) 114 of the motor. The motor 110 also may include a rectifier 116 that is electrically connected to the output side of the DC brushless exciter 120. A thyristor-based power regulator 140 may supply DC power from a power source 150 to the input side of the exciter 120. The regulator 140 may receive control commands from the VFD 100 controller.

Figure 2:
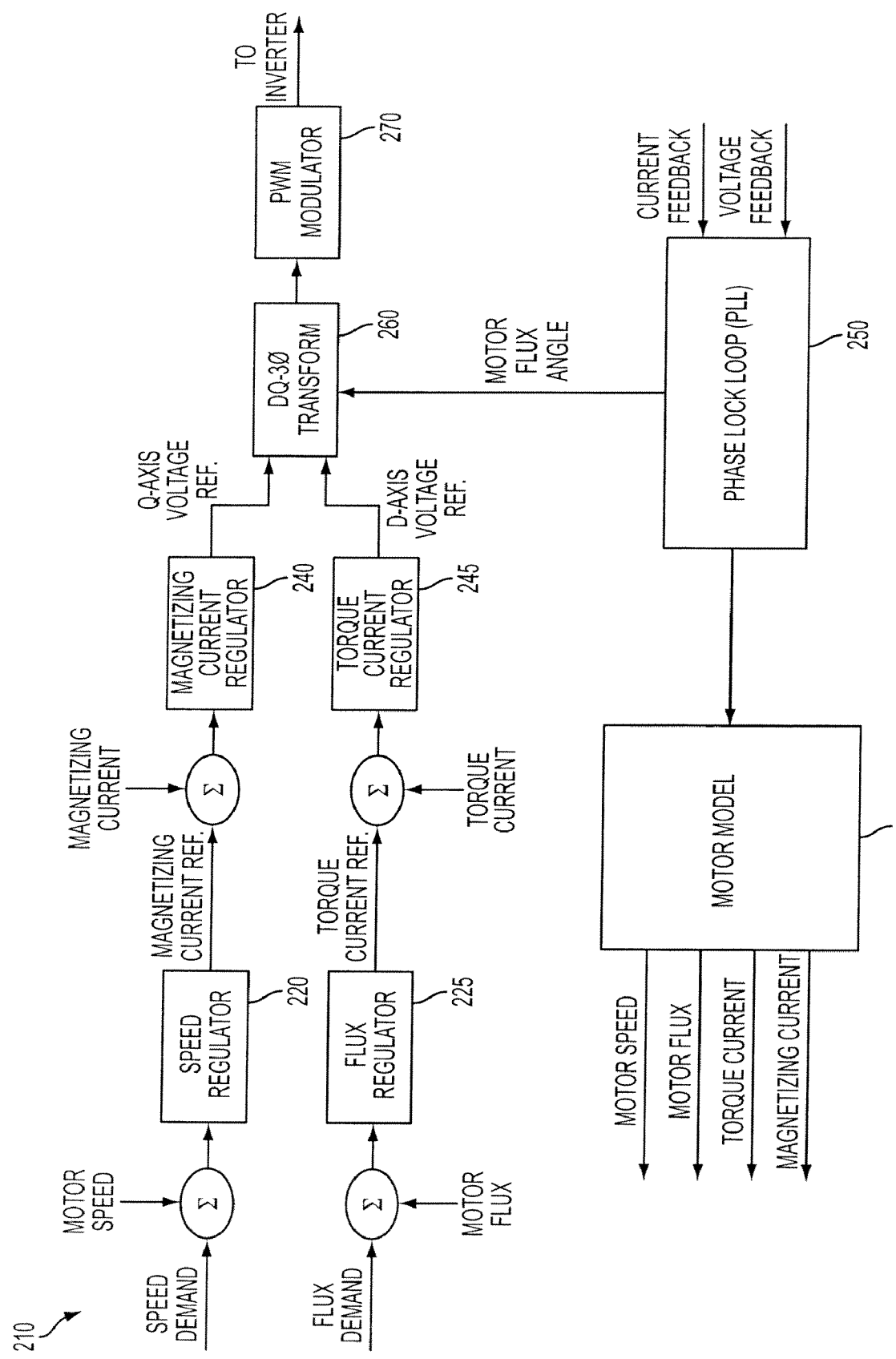
FIG. 2 is a block diagram of a motor control method.
Figure 3:
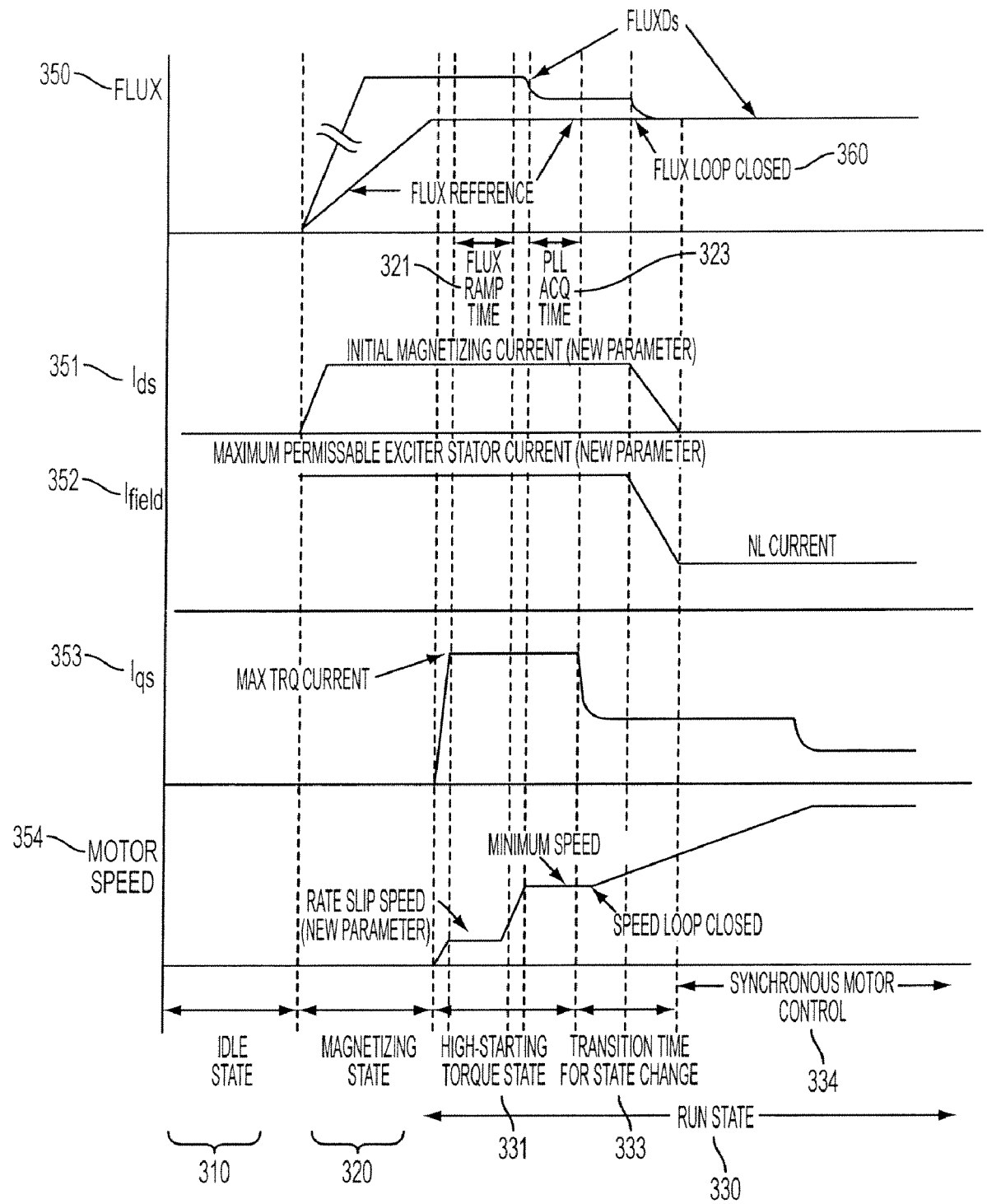
FIG. 3 is a timing diagram of an operation of a VFD to control a synchronous motor with a brushless DC exciter.

FIG. 2 illustrates a method of using a controlling startup of a synchronous motor with a brushless DC exciter in block diagram format. FIG. 3 illustrates the method in the form of a timing diagram, and the discussion below may refer to FIG. 2 and FIG. 3. The method may be used to start a synchronous motor that has a brushless DC exciter. A timing diagram of the VFD drive operation for an embodiment of the starting method is described below.

Referring to FIG. 3, a synchronous motor may be at rest or in an idle state 310 when a command to start the motor using a VFD is issued. Some or all of the subsequent steps may be performed regardless of speed demand. During an initial magnetization state 320, the VFD applies the specified initial magnetizing current ($I_{ds}$) 351 to build up flux 350 through the stator, while the output frequency is held at zero. A field current ($I_{field}$) 352 is applied to the DC exciter by the VFD during this time period, and during the magnetizing state 320 $I_{field}$ 352 is held at a constant value that is no more than or equal to the maximum permissible exciter stator current.

After the magnetizing state (e.g., at a time when the flux reference stops increasing), run state 330 beings. Run state 330 may be divided into certain time periods, including a high-starting torque state 331 and a transition time for state change to synchronous motor control 332. In the high-starting torque state 331, the drive ramps output frequency so that the motor speed 353 achieves the rated slip speed while increasing the torque component ($I_{qs}$) 353 of current to the setting in the high-starting torque mode menu that allows the motor to generate sufficient breakaway torque to overcome any stiction. This, along with the application of initial magnetizing current ($I_{ds}$) to the motor stator treats the motor as if it were an induction motor.

In the high-starting torque state 331, the drive maintains this torque current 353 and frequency 353 for time duration equal to a flux dwell time 321. During this period the motor should produce sufficient torque that would force the rotor to move (or oscillate under loaded condition). After the flux dwell time 321, the control increases the motor speed 354 from rated slip to the minimum speed while maintaining stator current.

The drive then ends the high-starting torque state 331 by enabling a phase-locked-loop (PLL) and waiting for a period of time, which may be established by a PLL Acq Time 323 parameter. During this period the PLL acquires motor flux and frequency.

After the PLL Acq Time 323 has elapsed, the drive control moves to a transition time 333 for state change to synchronous motor control. During this period, the drive reduces the torque 353 current slightly (e.g., to 90% of menu setting) and closes the speed loop. The speed loop may now receive motor speed 354 feedback and may attempt to regulate the torque component ($I_{qs}$) of motor current.

After a time period (such as one second), the flux loop may be enabled. The flux loop will now receive the feedback on the flux 350 and will try to regulate the magnetizing current ($I_{ds}$) 351 and the field current ($I_{field}$) 352.

By the time the magnetizing current ($I_{ds}$) is reduced to zero, there will be a no load main field current ($I_{field}$) 352 and control will be synchronized. From this point, the drive may operate in a normal synchronous motor control mode 334. The drive will be ready to ramp up to the desired speed demand as determined by customer specifications or an applied load.

Movement between any of the time periods listed above (e.g., the magnetizing state 320, the flux ramp time 321, the PLL Acq. time 323, and the other time periods described above) to the next may be controlled by a timer set to move from one state to another. The time may have a predetermined time period for each state, or time periods may vary among states. Alternatively shifts from one period to the next may be controlled based on actual motor condition real-time measurement.

FIG. 2 is a block diagram of exemplary elements of a control system. FIG. 2 shows that during the magnetizing state, the control system 210 components may be operated in open loop operation so that only a magnetizing current regulator 240 and torque current regulator 245 are enabled during the magnetizing state (320 in FIG. 3). In the high-starting torque state (331 in FIG. 3) the PLL 250 is enabled. During the PLL acquisition time (323 in FIG. 3), PLL 250 acquires current and voltage information from the motor to calculate the motor flux angle. Motor model 255 processes the motor flux angle information to produce updated values for motor speed and motor flux. During a transition time for state change (353 in FIG. 3), control system 210 switches to a closed loop operation by enabling speed regulator 220 and flux regulator 225. Speed regulator 220 does not consider either a desired speed from a master controller or actual motor speed when disabled during start-up, but instead may provide a predetermined value for the torque current (353 in FIG. 3). Once enabled, the speed regulator may compare a desired speed with the actual motor speed and may regulate the torque current ($I_{qs}$) reference accordingly.

Similarly, during start-up, flux regulator 225 does not consider either a desired flux from the master controller or the actual motor flux but instead may provide a predetermined value to produce an initial magnetizing current (351 in FIG. 3) and initial field current (352 in FIG. 3). Once enabled, flux regulator 225 may compare the desired flux demand with the actual motor flux and may regulate the motor stator magnetizing current ($I_{ds}$) reference and the exciter stator current ($I_{field}$) reference accordingly.

The updated current reference values along with motor feedback currents are processed to generate updated values for d, q reference voltages and forwarded to D-Q transform module 260. D-Q transform module 260 uses the motor flux angle (provided by PLL 250) to convert the voltage d,q references to AC signals that may be referred to the stator side of the motor. These AC signals may be converted to inverter switch commands using pulse width modulator (PWM) 270.

Figure 4:
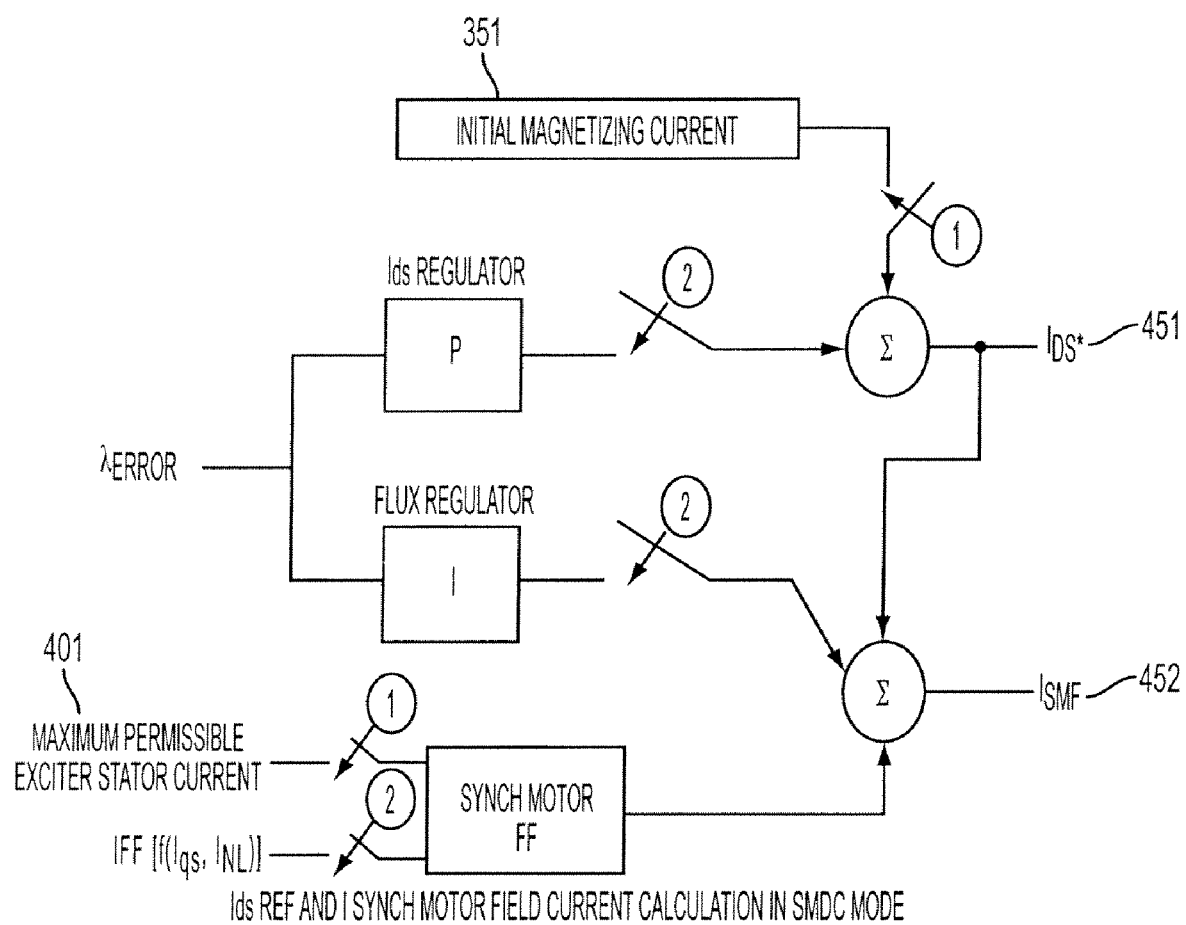
FIG. 4 is a block diagram describing how magnetizing current ($I_{ds}$) reference and field current ($I_{field}$) reference values may be determined.

Different values may be assigned to magnetizing current ($I_{ds}$) reference value and the field current ($I_{field}$) reference value before and after the flux loop is enabled. A smooth transition in the reference value may be achieved using the following strategy and is explained with the help of FIG. 4. During high-starting torque state (331 of FIG. 3) and until the flux loop is enabled(360 of FIG. 3), the reference values for magnetizing current ($I_{ds}$) 451 and the field current ($I_{field}$) 452 are dictated by initial magnetizing current 351 and maximum permissible exciter stator current 401, respectively.

Once the drive is out of the high-starting torque state (331 of FIG. 3) and the flux loop is enabled (360 of FIG. 3), the reference values for magnetizing current ($I_{ds}$) 451 and the field current ($I_{field}$) 452 may be determined as shown below:

$$Ids^* = \text{InitialMagnetizingCurrent}(t) + I_{dsReg}.P$$

$$Isynch = \text{SynchmotorFF}(t) + Ids^* + I$$

Figure 5:
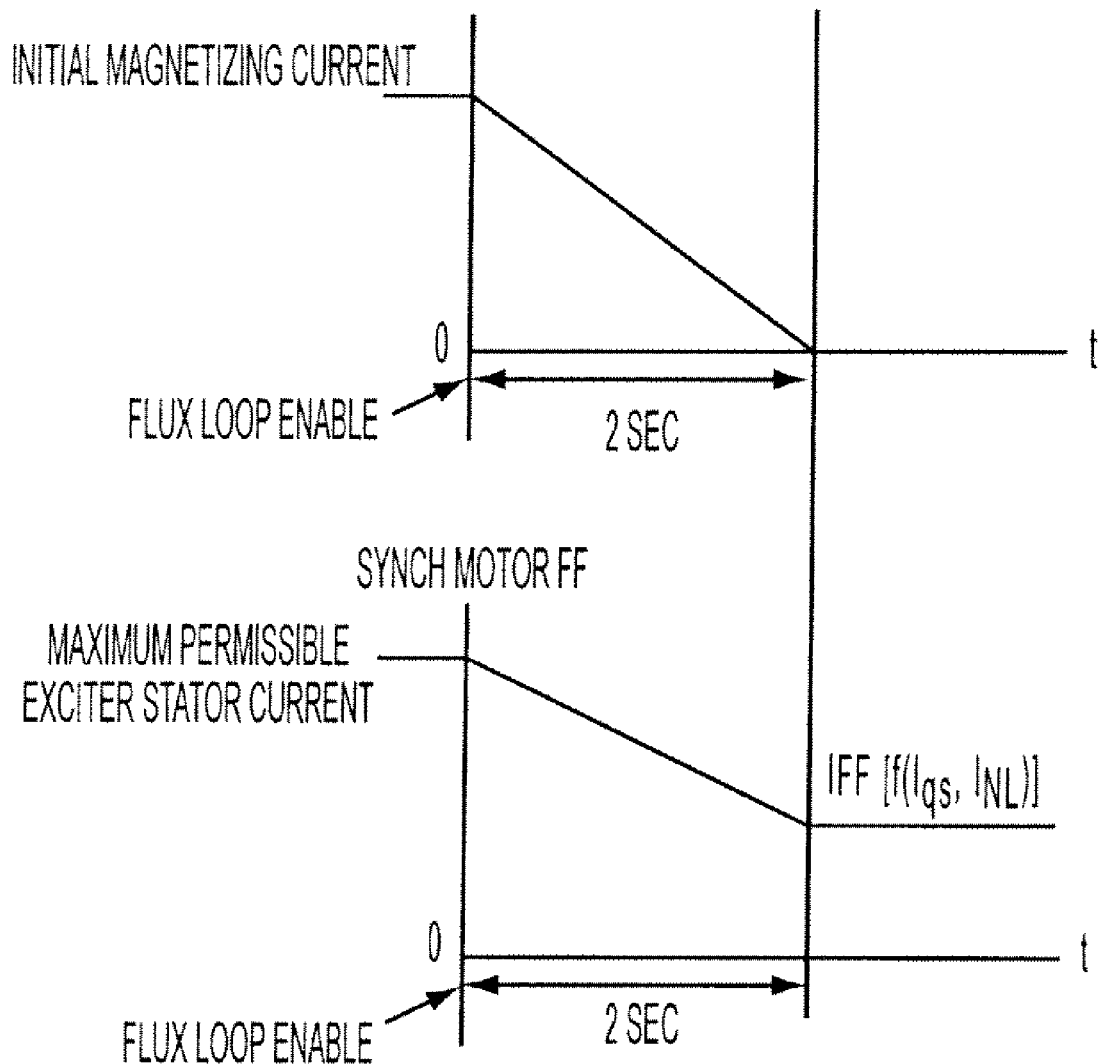
FIG. 5 illustrates an example of initial magnetizing current and synchronous motor feed forward (FF) current as a function of time.

An exemplary trend of initial magnetizing current and synchronous motor feed forward (FF) current as a function of time are shown in FIG. 5.

Figure 6:
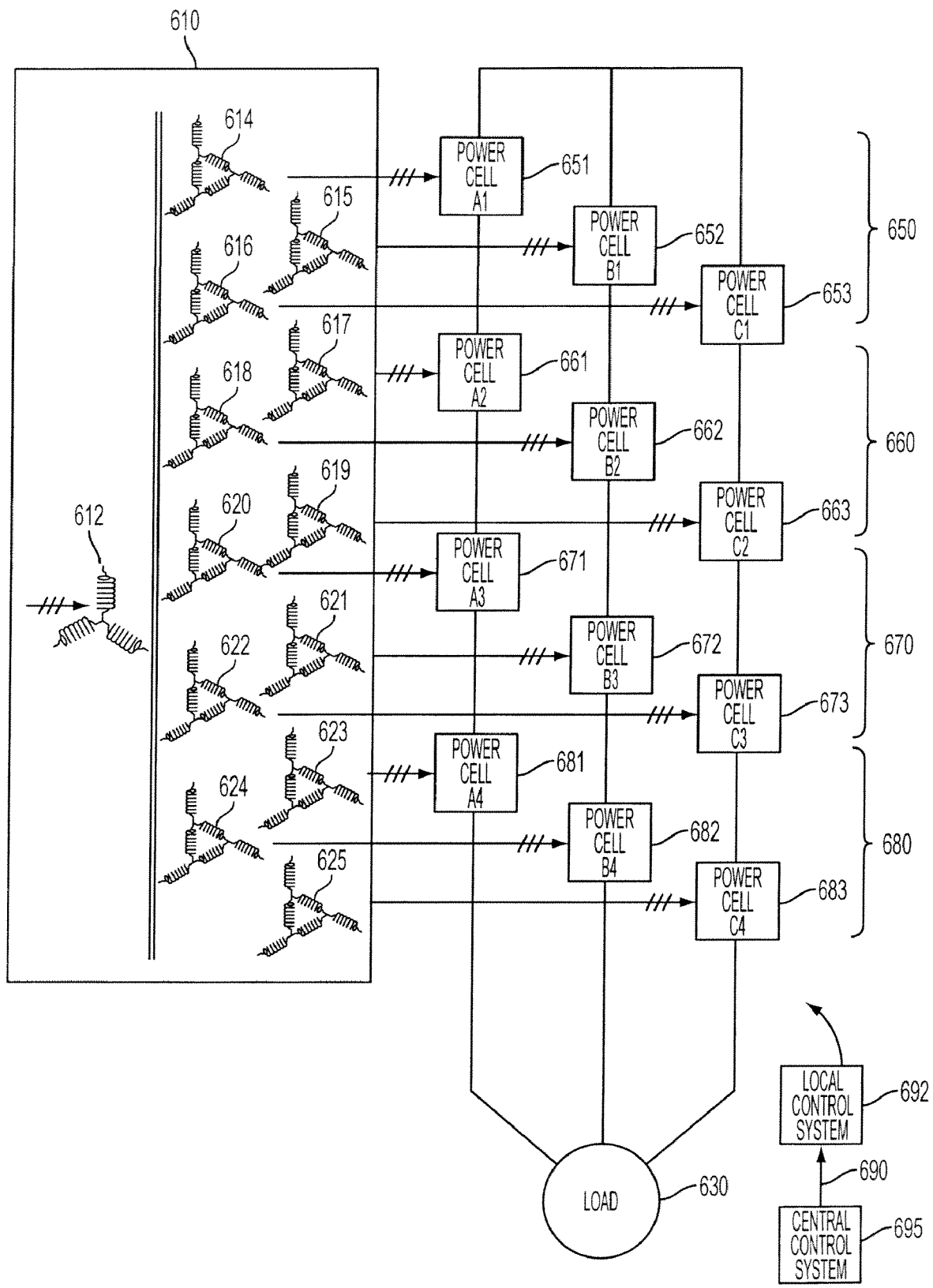
FIG. 6 is a block diagram that illustrates components of an exemplary variable-frequency drive.

FIG. 6 illustrates an exemplary embodiment of a variable frequency drive that may be used in the embodiments described herein. In FIG. 6, a transformer or other multi-winding device 610 delivers three-phase, medium-voltage power to a load 630 such as a three-phase induction motor via an array of single-phase inverters (also referred to as power cells). A three-phase inverter is not required in the array. The multi-winding device 610 includes primary windings 612 that excite a number of secondary windings 614-625. Although primary winding 612 is illustrated as having a star configuration, a mesh configuration is also possible. Further, although secondary windings 614-625 are illustrated as having an extended delta configuration. Further, the number of secondary windings illustrated in FIG. 6 is merely exemplary, and other numbers of secondary windings are possible. The circuit may be used for medium voltage applications (such as between about 690 volts and about 69 kilovolts) or, in some embodiments, other applications. Additional details about such a circuit are disclosed in U.S. Pat. No. 5,625,545 to Hammond, the disclosure of which is incorporated herein by reference in its entirety.

Any number of ranks of power cells are connected between the transformer 610 and the synchronous motor load 630. A "rank" is considered to be a three-phase set, or a group of power cells established across each of the three phases of the power delivery system. Referring to FIG. 6, rank 650 includes power cells 651-653, rank 660 includes power cells 661-663, rank 670 includes power cells 671-673, and rank 680 includes power cells 681-683. Fewer than four ranks, or more than four ranks, are possible. A central control system 695 sends command signals to local controls in each cell over fiber optics or another wired or wireless communications medium 690. It should be noted that the number of cells per phase depicted in FIG. 6 is exemplary, and more than or less than four ranks may be possible in various embodiments. For example, two ranks, four ranks, eight ranks, or other numbers of ranks are possible.

In some embodiments, some of these cells may process power only in one direction (for instance input to output). These are sometimes referred to as two-quadrant (2Q) or non-regenerative power cells. Others may be capable of processing power in either direction (for instance output to input and input to output) as long as there is an available energy source which can absorb this power. These are sometimes referred to as four-quadrant (4Q) or regenerative power cells.

The above-disclosed and other features and functions, or alternatives, may be desirably combined into many other different systems or applications. Various presently unforeseen or unanticipated alternatives, modifications, variations or improvements therein may be subsequently made by those skilled in the art. Such alternatives are also intended to be encompassed by the disclosed embodiments

What is claimed is:

1. A method of controlling startup of a synchronous motor having a brushless direct current exciter, comprising:
    applying, by a variable frequency drive controller, a magnetizing current to a motor stator and a predetermined field current to the exciter such that the motor is operated as an induction motor during a first time period;
    applying, by the variable frequency drive controller, a torque current to the motor stator to rotate a rotor;
    monitoring, at a phase lock loop operably connected to the variable frequency drive controller, current feedback and voltage feedback from the motor;
    reducing the magnetizing current applied to the motor stator and regulating the field current applied to the exciter after a certain transition speed such that the motor is operated as a synchronous motor during a second time period; and
    receiving, at a motor model controller operably connected to the phase lock loop, the current feedback and voltage feedback and providing a motor control component with motor speed and motor flux values during the second time period.

2. The method of claim 1, wherein said frequency drive controller applies said magnetizing current and said field current simultaneously.

3. The method of claim 1, wherein said torque current is raised to a predetermined level and held for a predetermined period of time.

4. The method of claim 3, wherein said predetermined level and said predetermined period of time are determined based upon a load being applied to said motor.

5. A system for controlling startup of a synchronous motor having a brushless direct current exciter comprising:
    a variable frequency drive controller configured to apply a magnetizing current to a motor stator for a predetermined period of time;
    a motor control component configured to switch operation of the motor to a closed loop such that the magnetizing current from said variable frequency drive controller is reduced so that the motor is operated as a synchronous motor during a second time period;
    a phase lock loop; and
    a motor model controller,
    wherein the phase lock loop controller monitors current feedback and voltage feedback from the motor and provides the motor model controller with the current feedback and the voltage feedback, and
    wherein the motor model controller provides the motor control component with motor speed and motor flux values during the synchronous motor operation.

6. The system of claim 5, wherein said frequency drive controller is further configured to apply a field current to the exciter.

7. The system of claim 6, wherein said frequency drive controller is configured to apply said magnetizing current and said field current simultaneously.

8. A method of controlling startup of a synchronous motor having a brushless direct current exciter, comprising:
    using a variable frequency drive controller to deliver an initial magnetizing current to a stator of the motor and a field current to the exciter;
    holding the field current at a maximum permissible exciter stator current level for a time period;
    after a magnetizing state period, applying a torque current such that a rotor of the motor begins to rotate;
    increasing the torque current and motor speed to a predetermined level;
    when the torque current reaches the predetermined level, holding the torque current and motor speed at that level for a flux dwell time period;
    after a time period set by a phase-locked loop, closing a speed loop to regulate the torque current, thereby initiating a transition to operating the motor synchronously;
    closing a flux loop to reduce the magnetizing current to zero and to regulate the field current; and
    operating the motor as a synchronous motor.

9. The method of claim 8, wherein said variable frequency drive control delivers said torque current.

10. The method of claim 9, wherein said maximum permissible exciter stator current level is regulated based upon a load being applied to said motor.

11. The method of claim 10, wherein said predetermined level of said torque current is regulated based upon a load being applied to said motor.

12. The method of claim 8, wherein a speed of said motor increases after said flux dwell time, said speed increasing to a minimum speed required for synchronous operation.

13. The method of claim 12, wherein said minimum speed is determined based upon a load on said motor.

* * * * *